United States Patent
Zhu

(10) Patent No.: US 11,799,582 B2
(45) Date of Patent: Oct. 24, 2023

(54) METHOD AND APPARATUS FOR DETECTING DOWNLINK CONTROL SIGNALING, AND SYSTEM

(71) Applicant: BEIJING XIAOMI MOBILE SOFTWARE CO., LTD., Beijing (CN)

(72) Inventor: Yajun Zhu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 275 days.

(21) Appl. No.: 17/296,690

(22) PCT Filed: Nov. 28, 2018

(86) PCT No.: PCT/CN2018/117931
§ 371 (c)(1),
(2) Date: May 25, 2021

(87) PCT Pub. No.: WO2020/107260
PCT Pub. Date: Jun. 4, 2020

(65) Prior Publication Data
US 2022/0045782 A1 Feb. 10, 2022

(51) Int. Cl.
*H04W 56/00* (2009.01)
*H04L 1/00* (2006.01)

(52) U.S. Cl.
CPC .......... *H04L 1/0003* (2013.01); *H04L 1/0027* (2013.01)

(58) Field of Classification Search
CPC ............................ H04L 1/0003; H04L 1/0027
USPC ......................................................... 370/329
See application file for complete search history.

(56) References Cited

U.S. PATENT DOCUMENTS

| | | | |
|---|---|---|---|
| 2010/0023830 | A1 | 1/2010 | Wengerter et al. |
| 2010/0091693 | A1 | 4/2010 | Pelletier et al. |
| 2010/0290559 | A1 | 11/2010 | Futagi et al. |
| 2012/0087438 | A1 | 4/2012 | Futagi et al. |

(Continued)

FOREIGN PATENT DOCUMENTS

| | | |
|---|---|---|
| CN | 101605356 A | 12/2009 |
| CN | 101777972 A | 7/2010 |

(Continued)

OTHER PUBLICATIONS

"Wu, The Channel Demodulation Method and Device, 2015, CN 105188141" (Year: 2015).*

(Continued)

*Primary Examiner* — Sai Ming Chan
(74) *Attorney, Agent, or Firm* — Arch & Lake LLP

(57) ABSTRACT

Disclosed are a downlink control signaling detection method and apparatus, and a system, belonging to the technical field of communications. Said method comprises: sending a first indication signal to an access network device; determining a target demodulation method for demodulating target downlink control signaling; acquiring target detection parameters corresponding to the target demodulation method; and detecting the target downlink control signaling according to the target detection parameters. The present disclosure acquires, by determining a target demodulation method for demodulating target downlink control signaling, target detection parameters corresponding to the target demodulation method, and detects the target downlink control signaling according to the target detection parameters.

17 Claims, 7 Drawing Sheets

Downlink control region

Downlink data region

(56) References Cited

U.S. PATENT DOCUMENTS

| | | | |
|---|---|---|---|
| 2013/0083763 | A1 | 4/2013 | Futagi et al. |
| 2015/0023307 | A1 | 1/2015 | Futagi et al. |
| 2015/0381310 | A1* | 12/2015 | Hammarwall ........ H04L 1/0026 370/329 |
| 2016/0337065 | A1* | 11/2016 | Yokomakura .......... H04J 11/005 |
| 2016/0380720 | A1 | 12/2016 | Futagi et al. |
| 2017/0078045 | A1 | 3/2017 | Hammarwall et al. |
| 2017/0366297 | A1 | 12/2017 | Futagi et al. |
| 2019/0158213 | A1 | 5/2019 | Futagi et al. |
| 2020/0274636 | A1 | 8/2020 | Futagi et al. |

FOREIGN PATENT DOCUMENTS

| | | |
|---|---|---|
| CN | 101841773 A | 9/2010 |
| CN | 101867445 A | 10/2010 |
| CN | 102026153 A | 4/2011 |
| CN | 102036346 A | 4/2011 |
| CN | 102595635 A | 7/2012 |
| CN | 102740372 A | 10/2012 |
| CN | 103260225 A | 8/2013 |
| CN | 103906244 A | 7/2014 |
| CN | 105188141 A | 12/2015 |
| CN | 106454901 A | 2/2017 |
| CN | 107425946 A | 12/2017 |
| CN | 108023722 A | 5/2018 |
| CN | 108633070 A | 10/2018 |
| CN | 108702708 A | 10/2018 |
| CN | 108811052 A | 11/2018 |
| WO | 2018107502 A1 | 6/2018 |

OTHER PUBLICATIONS

First Office Action of the Chinese Application No. 201880002196.4, dated Feb. 26, 2021, (18p).

Notice of Allowance of the Chinese application No. 201880002196.4, dated May 24, 2021, (6p).

Written Opinion of the International Search Authority in the International Application No. PCT/CN2018/117931, dated Sep. 2, 2019 with English translation (4p).

NTT DOCOMO, "Offline summary for PDCCH structure and search space part 2", 3GPP TSG RAN WG1 Meeting #94bis, R1-1811926, Chengdu, China, Oct. 8-12, 2018, (65p).

International Search Report of PCT Application No. PCT/CN2018/117931 dated Sep. 2, 2019 with English translation (4p).

Partial Supplementary European Search Report in the European Application No. 18941880.9, dated May 30, 2022, (17p).

* cited by examiner

METHOD AND APPARATUS FOR DETECTING DOWNLINK CONTROL SIGNALING, AND SYSTEM

CROSS-REFERENCE TO RELATED APPLICATION

This application is a U.S. national stage of International Application No. PCT/CN2018/117931 filed on Nov. 28, 2018, the disclosure of which is hereby incorporated by reference in its entirety.

TECHNICAL FIELD

The disclosure relates to the technical field of communications, and more particularly, to a method and apparatus for detecting downlink control signaling, and a system.

BACKGROUND

An access network device instructs, by sending downlink control signaling, a terminal to receive or send data in an instructed manner at a corresponding resource position.

Sometimes, methods for detecting the downlink control signaling include: the terminal continuously monitors Physical Downlink Control Channel (PDCCH) to detect the downlink control signaling sent from the access network device; and when receiving the downlink control signaling sent from the access network device, the terminal transmits data in a manner indicated in the downlink control signaling.

As there is a need to continuously monitor the PDCCH, the time of the terminal for detecting the downlink control signaling is long to cause the high energy consumption.

SUMMARY

The embodiments of the disclosure provide a method and apparatus for detecting downlink control signaling, and a system.

According to an aspect, the embodiments of the disclosure provide a method for detecting downlink control signaling, including:

a terminal sends a first indication signal to an access network device, the first indication signal being configured to indicate a to-be-used demodulation scheme of the terminal;

the terminal determines a target demodulation scheme for demodulating target downlink control signaling;

the terminal acquires a target detection parameter corresponding to the target demodulation scheme; and the terminal detects the target downlink control signaling according to the target detection parameter.

According to an aspect, the embodiments of the disclosure provide a method for determining a modulation scheme, including:

an access network device receives a first indication signal sent from a terminal, the first indication signal being configured to indicate a to-be-used demodulation scheme of the terminal;

the access network device determines a modulation scheme for target downlink control signaling according to the to-be-used demodulation scheme; and the access network device sends a second indication signal to the terminal, such that the terminal determines a target demodulation scheme for the target downlink control signaling according to a modulation scheme indicated in the second indication signal, the second indication signal being configured to indicate the modulation scheme of the access network device for the target downlink control signaling.

According to an aspect, the embodiments of the disclosure provide an apparatus for detecting downlink control signaling, which may be applied to a terminal, the apparatus including:

a sending module, configured to send a first indication signal to an access network device, the first indication signal being configured to indicate a to-be-used demodulation scheme of the terminal; and a processing module, configured to determine a target demodulation scheme for demodulating target downlink control signaling; acquire a target detection parameter corresponding to the target demodulation scheme; and detect the target downlink control signaling according to the target detection parameter.

According to an aspect, the embodiments of the disclosure provide an apparatus for determining a modulation scheme, which may be applied to an access network device, the apparatus including:

a receiving module, configured to receive a first indication signal sent from a terminal, the first indication signal being configured to indicate a to-be-used demodulation scheme of the terminal;

a processing module, configured to determine a modulation scheme for target downlink control signaling according to the to-be-used demodulation scheme; and a sending module, configured to send a second indication signal to the terminal, such that the terminal determines a target demodulation scheme for the target downlink control signaling according to a modulation scheme indicated in the second indication signal, the second indication signal being configured to indicate the modulation scheme of the access network device for the target downlink control signaling.

According to an aspect, the embodiments of the disclosure provide a terminal, which may include:

a processor; and a memory, configured to store an instruction executable by the processor, where the processor is configured to:

send a first indication signal to an access network device, the first indication signal being configured to indicate a to-be-used demodulation scheme of the terminal;

determine a target demodulation scheme for demodulating target downlink control signaling;

acquire a target detection parameter corresponding to the target demodulation scheme; and detect the target downlink control signaling according to the target detection parameter.

According to an aspect, the embodiments of the disclosure provide an access network device, which may include:

a processor; and a memory, configured to store an instruction executable by the processor, where the processor is configured to:

receive a first indication signal sent from a terminal, the first indication signal being configured to indicate a to-be-used demodulation scheme of the terminal;

determine a modulation scheme for target downlink control signaling according to the to-be-used demodulation scheme; and send a second indication signal to the terminal, such that the terminal determines a target demodulation scheme for the target downlink control signaling according to a modulation scheme indicated in the second indication signal, the second indication signal being configured to indicate the modulation scheme of the access network device for the target downlink control signaling.

According to an aspect, the embodiments of the disclosure provide a communication system, which may include the above-mentioned apparatus for detecting the downlink control signaling and the above-mentioned apparatus for determining the modulation scheme, or may include the above-mentioned terminal and the above-mentioned access network device.

According to an aspect, the embodiments of the disclosure provide a computer-readable storage medium having stored thereon at least one instruction, at least one segment of program, a code set or an instruction set that is loaded and executed by a processor to implement the above mentioned method for detecting the downlink control signaling, or, that is loaded and executed by the processor to implement the above mentioned method for determining the modulation scheme.

The technical solutions provided in the embodiments of the disclosure at least have the following beneficial effects.

The terminal determines the target demodulation scheme for demodulating the target downlink control signaling, acquires the target detection parameter corresponding to the target demodulation scheme, and detects the target downlink control signaling according to the target detection parameter. As the terminal detects the target downlink control signaling according to the target detection parameter associated with the target downlink control signaling, the disclosure solves the problem of the large energy consumption due to a fact that the terminal continuously monitors the PDCCH to cause the long time for detecting the target downlink control signaling, and reduces the energy consumption of the terminal to some extent.

BRIEF DESCRIPTION OF THE DRAWINGS

In order to describe the technical solutions in the embodiments of the disclosure more clearly, a simple introduction on the accompanying drawings which are needed in the description of the embodiments is given below. Apparently, the accompanying drawings in the description below are merely some of the embodiments of the disclosure, based on which other drawings may be obtained by those of ordinary skill in the art without any creative effort.

DETAILED DESCRIPTION

To make the objectives, technical solutions, and advantages of the disclosure clearer, the implementation manners of the disclosure are described below in detail in conjunction with the accompanying drawings.

The constant emergence of novel Internet applications such as Augmented Reality (AR)/Virtual Reality (VR) and vehicle-to-vehicle communication makes higher requirements on wireless communication technologies and urges the wireless communication technologies to be constantly evolved to meet the requirements of the applications. Presently, a cellular mobile communication technology is in an evolution stage for a new generation of technology, and an important feature of the new generation of technology is to support flexible configuration for multiple service types. Different service types have different requirements on the wireless communication technology. For example, the enhanced Mobile Broad Band (eMBB) mainly focuses on the large bandwidth, high rate and the like, the Ultra Reliable Low Latency Communication (URLLC) service type mainly focuses on the relatively high reliability, low delay and the like, and the massive Machine Type Communication (mMTC) service type mainly focuses on the large connection number. For the above reasons, the new-generation wireless communication system requires a more flexible and configurable design to support the transmission of the multiple service types.

For dynamic scheduling in an LTE system, one downlink control signaling may indicate only one time-frequency resource, and the time-frequency resource is configured to indicate a frequency-domain resource in a time-domain unit.

Figure 1:
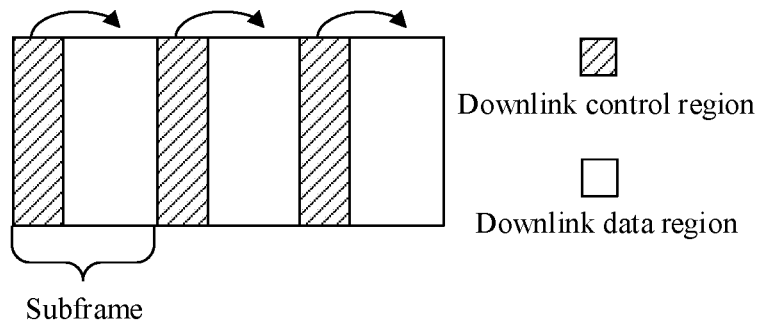
FIG. 1 is a schematic diagram showing a resource scheduling method.

FIG. 1 is a schematic diagram showing a resource scheduling method in an LTE system. In FIG. 1, descriptions are made with the case where the time-domain unit is a subframe and a shaded area and a white filled area form one subframe as an example. The shaded area is a downlink control region configured to transmit control signaling, the control signaling including scheduling signaling, to indicate that the terminal receives data on a time-frequency resource indicated by the arrowhead thereof. The white filled area is a downlink data region, i.e., the time-frequency resource indicated by the arrowhead of the scheduling signaling, for data reception of the terminal.

The endurance of the terminal is an important indicator to affect the performance of the terminal. There is a need for the terminal to continuously detect whether the signaling is received. When the terminal does not need to perform service interaction, the access network device does not send the signaling to the terminal, but the terminal still needs to detect whether the signaling is received, which results in that the energy consumption of the terminal is large. Hence, a dormant state is defined in the LTE system. The terminal enters the dormant state when unnecessarily performing the service interaction, so as to avoid the detection on the signaling and reduce the energy consumption of the terminal.

Figure 2:
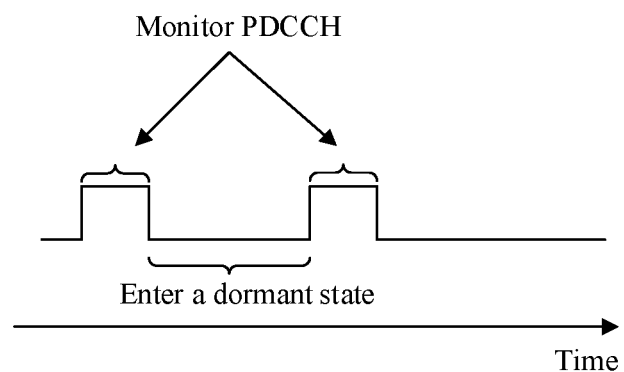
FIG. 2 is a schematic diagram showing that a terminal monitors PDCCH.

As shown in FIG. 2, when the terminal is in the dormant state, the terminal may periodically monitor PDCCH based on configuration of the access network device. Optionally, the terminal may monitor the PDCCH at a Paging Occasion (PO), enters an activated state for data reception if receiving an indication that downlink control signaling includes a paging message of the terminal, and continuously enters the dormant state and periodically monitors the PDCCH again if receiving an indication that the downlink control signaling does not include the paging message of the terminal, thereby saving the energy consumption of the terminal.

Figure 3:
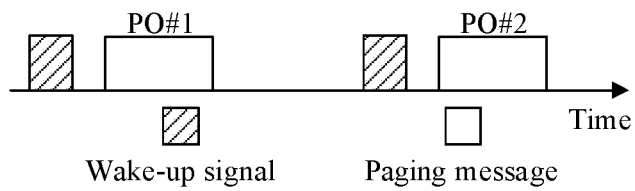
FIG. 3 is a schematic diagram showing that a terminal monitors a wake-up signal.

As shown in FIG. 3, the access network device may send a wake-up signal before sending the paging message, the wake-up signal carrying an indication whether the paging message of the terminal is included. The terminal may periodically monitor whether the wake-up signal is received, enters the activated state for data reception if receiving an indication that the wake-up signal includes the paging message of the terminal, and continuously enters the dormant state and periodically monitors the PDCCH again if receiving an indication that the wake-up signal does not include the paging message of the terminal, thereby saving the energy consumption of the terminal.

Although the energy consumption of the terminal may be saved in the method of monitoring the PDCCH and/or the wake-up signal, the terminal still needs to continuously monitor the PDCCH, which results in that the time of the terminal for detecting the downlink control signaling is long to cause the large energy consumption of the terminal and affect the endurance of the terminal.

Figure 4:
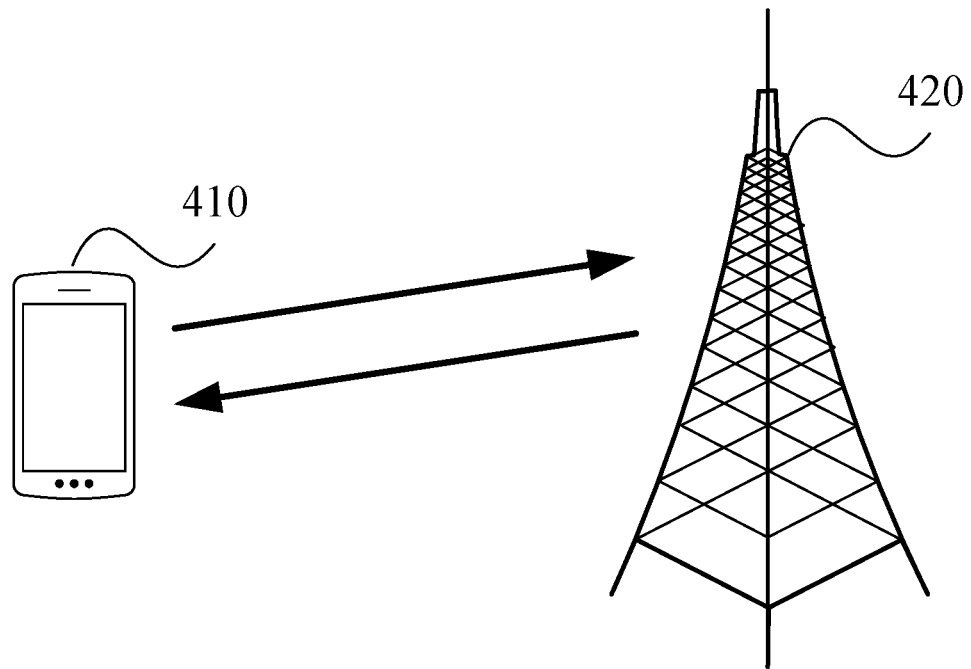
FIG. 4 is a schematic diagram showing an implementation environment involved in each embodiment of the disclosure.

FIG. 4 is a schematic diagram showing an implementation environment involved in a method for detecting downlink signaling provided by an embodiment of the disclosure. As shown in FIG. 4, the implementation environment may include a terminal 410 and at least one access network device 420 (only one access network device 420 is shown in FIG. 4).

The terminal 410 establishes a wireless connection with the access network device 420 through a wireless air interface. The terminal 410 sends a first indication signal to the access network device 420, the first indication signal being configured to indicate a to-be-used demodulation scheme of the terminal; determines a target demodulation scheme for demodulating target downlink control signaling; acquires a target detection parameter corresponding to the target demodulation scheme; and detects the target downlink control signaling according to the target detection parameter.

The access network device 420 determines a modulation scheme for the target downlink control signaling according to the to-be-used demodulation scheme indicated in the first indication signal upon the reception of the first indication signal sent from the terminal, and sends a second indication signal to the terminal 410, such that the terminal determines the target demodulation scheme for the target downlink control signaling according to a modulation scheme indicated in the second indication signal.

Figure 5:
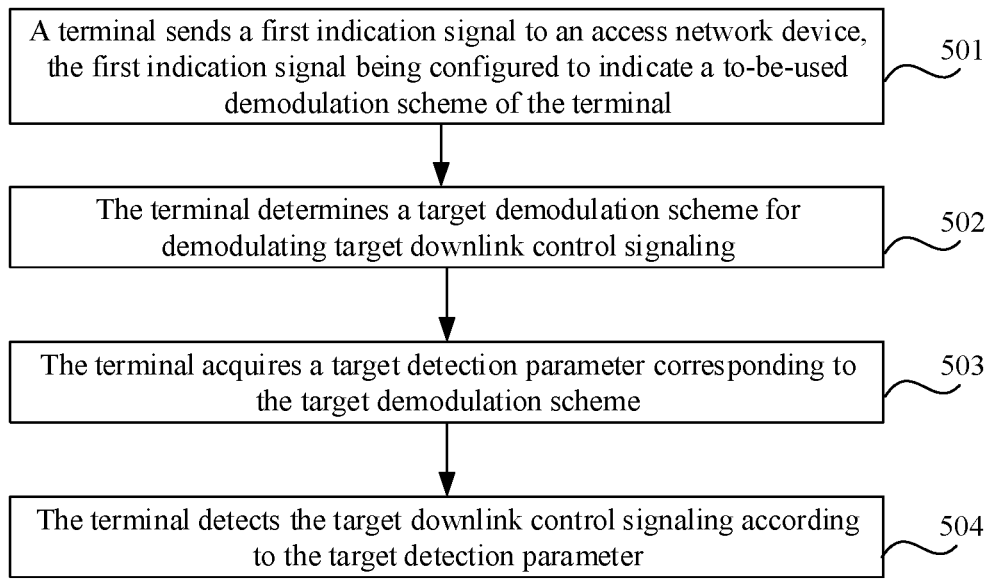
FIG. 5 is a flow chart showing a method for detecting downlink control signaling provided by an exemplary embodiment of the disclosure.

FIG. 5 shows a method for detecting downlink control signaling provided by an exemplary embodiment of the disclosure. The method may be applied to the terminal 410 in the embodiment of FIG. 4, and include the following operations.

In Operation 501, the terminal sends a first indication signal to an access network device, the first indication signal being configured to indicate a to-be-used demodulation scheme of the terminal.

The to-be-used demodulation scheme is a demodulation scheme for the downlink control signaling that is determined by the terminal according to present channel quality.

Optionally, the terminal acquires the present channel quality when detecting that surrounding channel quality changes, determines the to-be-used demodulation scheme according to the present channel quality, and sends the first indication signal to the access network device.

Exemplarily, when detecting that the surrounding channel quality changes, for example, the channel quality changes from a low-order supported demodulation scheme to a high-order supported demodulation scheme, the terminal acquires the present channel quality, takes a demodulation scheme matched with the present channel quality as the to-be-used demodulation scheme, and sends the first indication signal to the access network device to report the to-be-used demodulation scheme.

Optionally, the terminal acquires the present channel quality every second time interval, determines the to-be-used demodulation scheme according to the present channel quality, and sends the first indication signal to the access network device.

Exemplarily, the terminal acquires the present channel quality by detecting every the second time interval, takes a demodulation scheme matched with the present channel quality as the to-be-used demodulation scheme, and sends the first indication signal to the access network device to report the to-be-used demodulation scheme.

After the terminal establishes the connection with the access network device, the access network device may send a supportable demodulation scheme set to the terminal through Radio Resource Control (RRC) signaling, Media Access Control (MAC) Control Element (CE) or physical layer signaling, or, the supportable demodulation scheme set is predefined in the terminal. For example, the set may be {Quadrature Phase Shift Keying (QPSK), 16 Quadrature Amplitude Modulation (QAM), 64 QAM, 256 QAM}.

In Operation 502, the terminal determines a target demodulation scheme for demodulating target downlink control signaling.

The target downlink control signaling is downlink control signaling sent to the terminal after the access network device receives the first indication signal.

The terminal may determine the target demodulation scheme through the following manners. (1) The terminal determines a present demodulation scheme as the target demodulation scheme. (2) The terminal determines the to-be-used demodulation scheme as the target demodulation scheme. (3) The terminal receives a second indication signal sent from the access network device, and determines the target demodulation scheme according to a modulation scheme indicated in the second indication signal. The modulation scheme indicated in the second indication signal is a modulation scheme determined according to the to-be-used demodulation scheme after the access network device receives the first indication signal.

In Operation 503, the terminal acquires a target detection parameter corresponding to the target demodulation scheme.

The target detection parameter includes a relevant parameter of the target downlink control signaling. For example, the target detection parameter indicates a target position for receiving the target downlink control signaling, and/or, a detection moment for detecting the target downlink control signaling.

Exemplarily, correspondence relationships between demodulation schemes and detection parameters are stored in the terminal. The correspondence relationships may be correspondence relationships predefined in the terminal, and may also be sent to the terminal from the access network device. The access network device may send a third indication signal to the terminal, the third indication signaling carrying the correspondence relationships. As shown in Table 1, if the target demodulation scheme is demodulation scheme 2, the detection parameter 2 corresponding to the demodulation scheme 2 is the target detection parameter.

TABLE 1

| Demodulation scheme | Detection parameter of downlink control signaling |
| --- | --- |
| Demodulation scheme 1 | Detection parameter 1 |
| Demodulation scheme 2 | Detection parameter 2 |
| Demodulation scheme 3 | detection parameter 3 |
| Demodulation scheme 4 | Detection parameter 4 |

In Operation 504, the terminal detects the target downlink control signaling according to the target detection parameter.

The terminal detects the target downlink control signaling according to the target detection parameter. For example, the target detection parameter includes the target position and the detection moment. The terminal detects the target downlink control signaling at the target position and the detection moment according to the target detection parameter.

To sum up, in the embodiment of the disclosure, the terminal determines the target demodulation scheme for demodulating the target downlink control signaling, acquires the target detection parameter corresponding to the target demodulation scheme, and detects the target downlink control signaling according to the target detection parameter. As the terminal detects the target downlink control signaling according to the target detection parameter associated with the target downlink control signaling, the disclosure solves the problem of the large energy consumption due to a fact that the terminal continuously monitors the PDCCH to cause the long time for detecting the target downlink control signaling, and reduces the energy consumption of the terminal to some extent.

Figure 6:
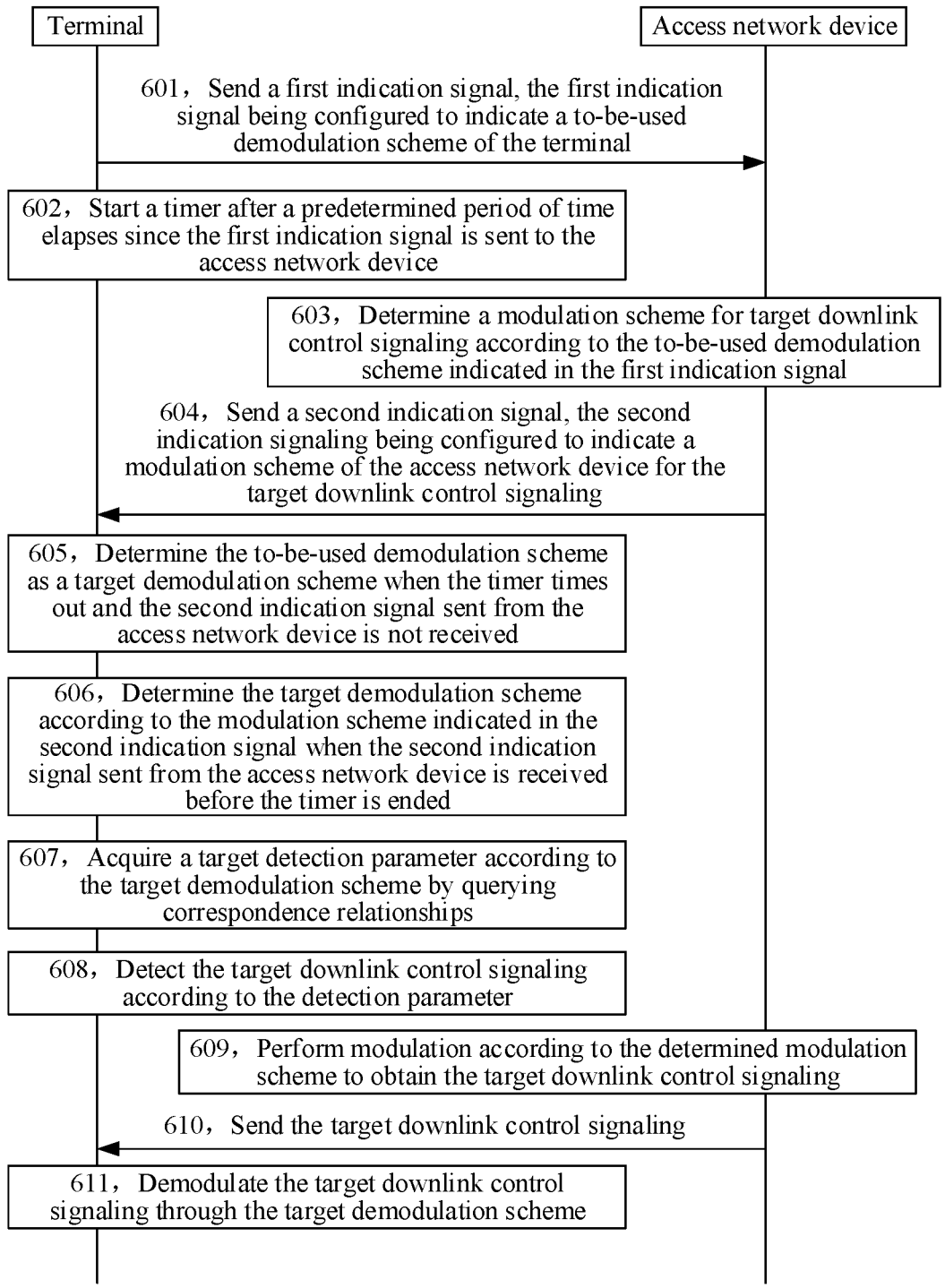
FIG. 6 is a flow chart showing a method for detecting downlink control signaling provided by an exemplary embodiment of the disclosure.

FIG. 6 shows a method for detecting downlink control signaling provided by an exemplary embodiment of the disclosure. The method may be applied to the implementation environment in the embodiment of FIG. 4, and include the following operations.

In Operation 601, a terminal sends a first indication signal to an access network device, the first indication signal being configured to indicate a to-be-used demodulation scheme of the terminal.

The method that the terminal sends the first indication signal to the access network device may refer to operation 501 in the embodiment of FIG. 5, and will not be elaborated herein.

In Operation 602, the terminal starts a timer after a predetermined period of time elapses since the first indication signal is sent to the access network device.

The terminal may determine a target demodulation scheme according to a second indication signal sent from the access network device. The terminal determines the target demodulation scheme through a timer mechanism before receiving the second indication signal. The second indication signal indicates the terminal of a modulation scheme that the access network device modulates the target downlink control signaling.

The timing time of the timer is the time predefined in the terminal; or, the timing time that is indicated by the access network device to the terminal through signaling after the access network device establishes the connection with the terminal. After the timer is started and before the timer times out, the terminal uses a present demodulation scheme as the target demodulation scheme to demodulate downlink control signaling sent from the access network device.

When the timer times out and the second indication signal sent from the access network device is not received, the terminal executes operation 605; and when the second indication signal sent from the access network device is received before the timer is ended, the terminal executes operation 606.

In Operation 603, the access network device determines a modulation scheme for target downlink control signaling according to the to-be-used demodulation scheme indicated in the first indication signal.

Upon the reception of the first indication signal, the access network device determines the modulation scheme for the target downlink control signaling according to the to-be-used demodulation scheme of the terminal that is indicated in the first indication signal. For example, if the first indication signal received by the access network device indicates that the terminal uses the 64 QAM demodulation scheme to demodulate the target downlink control signaling, it is indicated that the channel quality when the terminal reports the first indication signal is matched with the 64 QAM demodulation scheme, and correspondingly, the access network device determines the modulation scheme for the target downlink control signaling as 64 QAM; and if the access network device determines that the 64 QAM is unsuitable for modulating the target downlink control signaling, another modulation scheme is determined to modulate the target downlink control signaling.

In Operation 604, the access network device sends a second indication signal to the terminal, the second indication signal being configured to indicate a modulation scheme of the access network device for the target downlink control signaling.

After determining the modulation scheme for the target downlink control signaling, the access network device sends the second indication signal to the terminal, such that the terminal determines a target demodulation scheme according to the modulation scheme indicated in the second indication signal. For example, the access network device determines that the modulation scheme for modulating the downlink control signaling is 64 QAM, and sends the second indication signal to the terminal to indicate that the access network device uses the 64 QAM modulation scheme to modulate the target downlink control signaling.

In Operation 605, the terminal determines the to-be-used demodulation scheme as a target demodulation scheme.

When the timer times out and the second indication signal sent from the access network device is not received, the terminal determines the to-be-used demodulation scheme as the target demodulation scheme.

Exemplarily, the present demodulation scheme of the terminal is QPSK, and the to-be-used demodulation scheme is 64 QAM. When the second indication signal is not received before the timer is ended, the terminal uses the QPSK to demodulate the downlink control signaling; and when the timer is ended but the second indication signal is not received, the terminal uses the 64 QAM to demodulate the downlink control signaling.

In Operation 606, the terminal determines the target demodulation scheme according to the modulation scheme indicated in the second indication signal.

When the second indication signal sent from the access network device is received before the timer is ended, the terminal determines the target demodulation scheme according to the modulation scheme indicated in the second indication signal.

Exemplarily, the present demodulation scheme of the terminal is QPSK, and the to-be-used demodulation scheme is 64 QAM. When the second indication signal is not received before the timer is ended, the terminal uses the QPSK to demodulate the downlink control signaling; and when the second indication signal is received before the timer is ended, if the second indication signal indicates that the access network device uses the 64 QAM to modulate the target downlink control signaling, the terminal uses the 64 QAM to demodulate the downlink control signaling.

In Operation 607, the terminal acquires a target detection parameter according to the target demodulation scheme by querying correspondence relationships.

The correspondence relationships includes correspondence relationships between demodulation schemes and detection parameters. Optionally, the target detection parameter includes a first time interval, and/or, a target position for receiving the target downlink control signaling. The correspondence relationships may be correspondence relationships predefined in the terminal, and may also be sent to the terminal from the access network device.

Optionally, after establishing the connection with the access network device, the terminal receives a third indication signal sent from the access network device, information included in the third indication signal including the correspondence relationships between the demodulation scheme and the detection parameter.

Optionally, the target detection parameter further includes at least one of: a format of the target downlink control signaling, an aggregation level of the target downlink control signaling or a radio network temporary identity of the terminal.

In Operation 608, the terminal detects the target downlink control signaling according to the detection parameter.

The method that the terminal detects the target downlink control signaling according to the detection parameter includes but not limited to the followings.

The terminal acquires a first moment for sending the first indication signal, adds the first moment with the first time interval in the target detection parameter to obtain a detection moment, and detects the target downlink control signaling at the detection moment.

Or, the terminal detects, according to a target position in the target detection parameter, the target downlink control signaling at the target position.

Or, the terminal acquires a first moment for sending the first indication signal, adds the first moment with the first time interval in the target detection parameter to obtain a detection moment, and detects, according to a target position in the target detection parameter, the target downlink control signaling at the detection moment and the target position.

Or, the terminal acquires a fourth time interval in the target detection parameter, and detects the target downlink control signaling every the fourth time interval after sending the first indication signal. The fourth time interval is greater than a period that the terminal monitors the PDCCH in the LTE system, and different demodulation schemes correspond to different fourth time intervals.

Or, the terminal acquires a first moment for sending the first indication signal, adds the first moment with the first time interval in the target detection parameter to obtain a detection moment, acquires a fourth time interval in the target detection parameter, and detects the target downlink control signaling every the fourth time interval from the detection moment.

Or, the terminal acquires a first moment for sending the first indication signal, adds the first moment with the first time interval in the target detection parameter to obtain a detection moment, acquires a fourth time interval and a target position in the target detection parameter, and detects the target downlink control signaling at the target position every the fourth time interval from the detection moment.

In Operation 609, the access network device performs modulation according to the determined modulation scheme to obtain the target downlink control signaling.

In Operation 610, the access network device sends the target downlink control signaling to the terminal.

Exemplarily, the access network device acquires, according to information included in the first indication information, a first moment of the terminal for sending the first indication signal, adds the first moment with a third time interval to obtain a sending moment, and sends the target downlink control signaling to the terminal at the sending moment and a target position.

In Operation 611, the terminal demodulates the target downlink control signaling through the target demodulation scheme.

The terminal demodulates the target downlink control signaling through the target demodulation scheme after receiving the target downlink control signaling sent from the access network device.

To sum up, in the embodiment of the disclosure, the terminal determines the target demodulation scheme for demodulating the target downlink control signaling, acquires the target detection parameter corresponding to the target demodulation scheme, and detects the target downlink control signaling according to the target detection parameter. As the terminal detects the target downlink control signaling according to the target detection parameter associated with the target downlink control signaling, the disclosure solves the problem of the large energy consumption due to a fact that the terminal continuously monitors the PDCCH to cause the long time for detecting the target downlink control signaling, and reduces the energy consumption of the terminal to some extent.

Optionally, in the embodiment of the disclosure, the terminal starts the timer after reporting the to-be-used demodulation scheme for predetermined time, and takes the to-be-used demodulation scheme as the target demodulation scheme to demodulate the target downlink control signaling when the timer is time-out but the second signal sent from the access network device and indicating the modulation scheme is not received, so the disclosure solves the problem that the target demodulation scheme cannot be determined due to a fact that the terminal does not receive the second signal sent from the access network device for a long time, and improves the data transmission efficiency between the terminal and the access network device.

Optionally, in the embodiment of the disclosure, the terminal starts the timer after reporting the to-be-used demodulation scheme for predetermined time, and determines the target demodulation scheme according to the modulation scheme of the second signal when the timer is not time-out but the second signal sent from the access network device and indicating the modulation scheme is received, so the disclosure solves the problem that the terminal cannot demodulate the target downlink control signaling due to a fact that the modulation scheme of the access network device is not corresponding to the target demodulation scheme of the terminal, and improves the data transmission efficiency between the terminal and the access network device.

Figure 7:
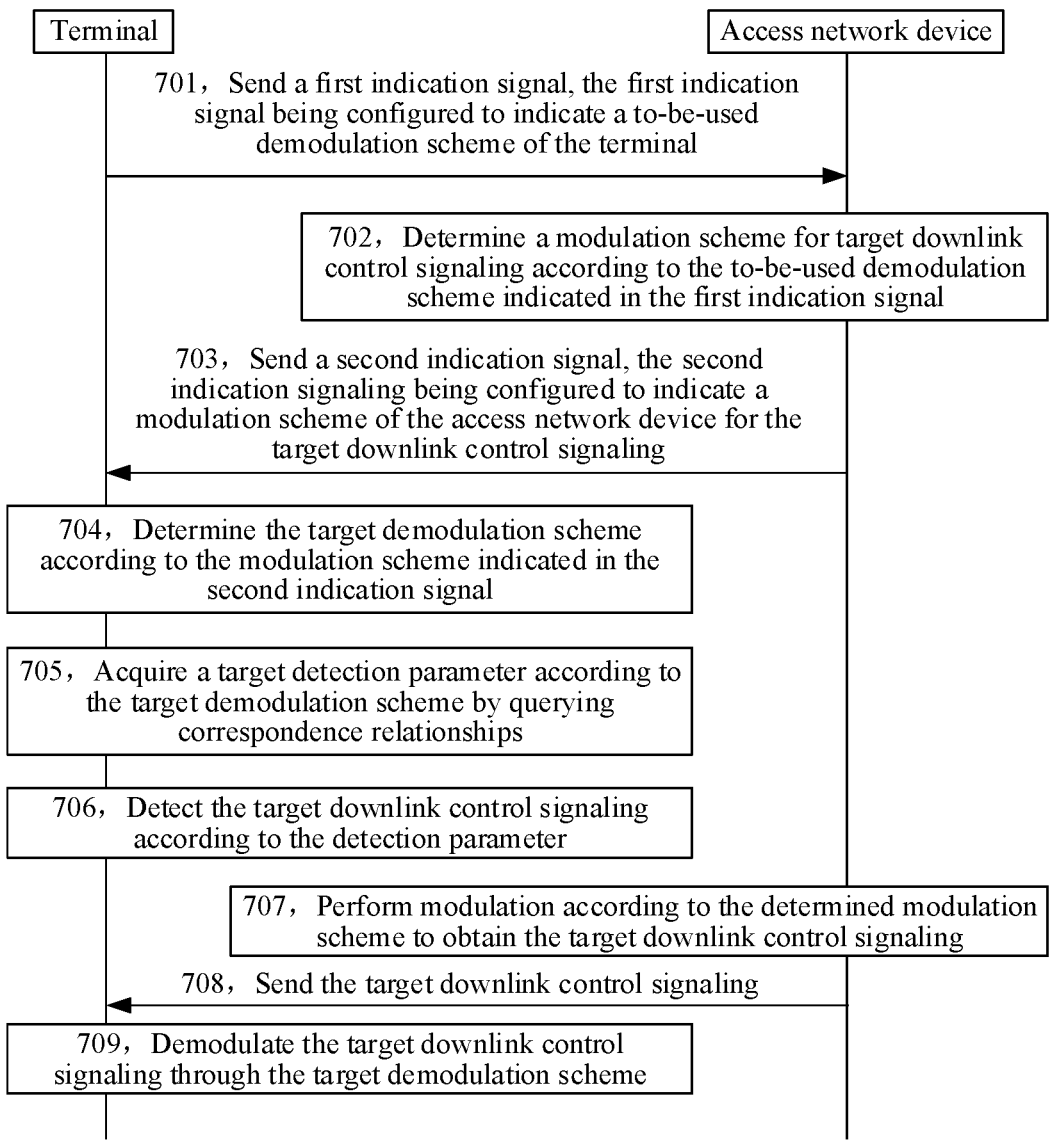
FIG. 7 is a flow chart showing a method for detecting downlink control signaling provided by an exemplary embodiment of the disclosure.

FIG. 7 shows a method for detecting downlink control signaling provided by an exemplary embodiment of the disclosure. The method may be applied to the implementation environment in the embodiment of FIG. 4, and include the following operations.

In Operation 701, a terminal sends a first indication signal to an access network device, the first indication signal being configured to indicate a to-be-used demodulation scheme of the terminal.

The method that the terminal sends the first indication signal to the access network device may refer to operation 501 in the embodiment of FIG. 5, and will not be elaborated herein.

In Operation 702, the access network device determines a modulation scheme for target downlink control signaling according to the to-be-used demodulation scheme indicated in the first indication signal.

Upon the reception of the first indication signal, the access network device determines the modulation scheme for the target downlink control signaling according to the to-be-used demodulation scheme of the terminal that is indicated in the first indication signal. For example, if the first indication signal received by the access network device indicates that the terminal uses the 64 QAM demodulation scheme to demodulate the target downlink control signaling, it is indicated that the channel quality when the terminal reports the first indication signal is matched with the 64 QAM demodulation scheme, and correspondingly, the access network device determines the modulation scheme for the target downlink control signaling as 64 QAM; and if the access network device determines that the 64 QAM is unsuitable for modulating the target downlink control signaling, another modulation scheme is determined to modulate the target downlink control signaling.

In Operation 703, the access network device sends a second indication signal to the terminal, the second indication signal being configured to indicate a modulation scheme of the access network device for the target downlink control signaling.

After determining the modulation scheme for the target downlink control signaling, the access network device sends the second indication signal to the terminal, such that the terminal determines a target demodulation scheme according to the modulation scheme indicated in the second indication signal. For example, the access network device determines that the modulation scheme for modulating the downlink control signaling is 64 QAM, and sends the second indication signal to the terminal to indicate that the access network device uses the 64 QAM modulation scheme to modulate the target downlink control signaling.

In Operation 704, the terminal determines the target demodulation scheme according to the modulation scheme indicated in the second indication signal.

Upon the reception of the second indication signal, the terminal determines, according to the modulation scheme indicated in the second indication signal, a demodulation scheme corresponding to the modulation scheme as the target demodulation scheme.

Exemplarily, the second indication signal received by the terminal indicates that the access network device uses the 64 QAM to modulate the target downlink control signaling, and correspondingly, the terminal uses the 64 QAM to demodulate the downlink control signaling.

In Operation 705, the terminal acquires a target detection parameter according to the target demodulation scheme by querying correspondence relationships.

The correspondence relationships includes correspondence relationships between demodulation schemes and detection parameters. Optionally, the target detection parameter includes a first time interval, and/or, a target position for receiving the target downlink control signaling. The correspondence relationships may be correspondence relationships predefined in the terminal, and may also be sent to the terminal from the access network device.

Optionally, after establishing the connection with the access network device, the terminal receives a third indication signal sent from the access network device, information included in the third indication signal including the correspondence relationships between the demodulation scheme and the detection parameter.

Optionally, the target detection parameter further includes at least one of: a format of the target downlink control signaling, an aggregation level of the target downlink control signaling or a radio network temporary identity of the terminal.

In Operation 706, the terminal detects the target downlink control signaling according to the detection parameter.

The method that the terminal detects the target downlink control signaling according to the detection parameter includes but not limited to the followings.

The terminal acquires a first moment for sending the first indication signal, adds the first moment with the first time interval in the target detection parameter to obtain a detection moment, and detects the target downlink control signaling at the detection moment.

Or, the terminal detects, according to a target position in the target detection parameter, the target downlink control signaling at the target position.

Or, the terminal acquires a first moment for sending the first indication signal, adds the first moment with the first time interval in the target detection parameter to obtain a detection moment, and detects, according to a target position in the target detection parameter, the target downlink control signaling at the detection moment and the target position.

Or, the terminal acquires a fourth time interval in the target detection parameter, and detects the target downlink control signaling every the fourth time interval after sending the first indication signal. The fourth time interval is greater than a period that the terminal monitors the PDCCH in the LTE system, and different demodulation schemes correspond to different fourth time intervals.

Or, the terminal acquires a first moment for sending the first indication signal, adds the first moment with the first time interval in the target detection parameter to obtain a detection moment, acquires a fourth time interval in the target detection parameter, and detects the target downlink control signaling every the fourth time interval from the detection moment.

Or, the terminal acquires a first moment for sending the first indication signal, adds the first moment with the first time interval in the target detection parameter to obtain a detection moment, acquires a fourth time interval and a target position in the target detection parameter, and detects the target downlink control signaling at the target position every the fourth time interval from the detection moment.

In Operation 707, the access network device performs modulation according to the determined modulation scheme to obtain the target downlink control signaling.

In Operation 708, the access network device sends the target downlink control signaling to the terminal.

Exemplarily, the access network device acquires, according to information included in the first indication information, a first moment of the terminal for sending the first indication signal, adds the first moment with a third time interval to obtain a sending moment, and sends the target downlink control signaling to the terminal at the sending moment and a target position.

In Operation 709, the terminal demodulates the target downlink control signaling through the target demodulation scheme.

The terminal demodulates the target downlink control signaling through the target demodulation scheme after receiving the target downlink control signaling sent from the access network device.

To sum up, in the embodiment of the disclosure, the terminal determines the target demodulation scheme for demodulating the target downlink control signaling, acquires the target detection parameter corresponding to the target demodulation scheme, and detects the target downlink control signaling according to the target detection parameter. As the terminal detects the target downlink control signaling according to the target detection parameter associated with the target downlink control signaling, the disclosure solves the problem of the large energy consumption due to a fact that the terminal continuously monitors the PDCCH to cause the long time for detecting the target downlink control signaling, and reduces the energy consumption of the terminal to some extent.

Optionally, in the embodiment of the disclosure, the terminal determines the target demodulation scheme according to the modulation scheme indicated in the second signal sent from the access network device, so the disclosure solves the problem that the terminal cannot demodulate the target downlink control signaling due to a fact that the modulation scheme of the access network device is not corresponding to the target demodulation scheme of the terminal, and improves the data transmission efficiency between the terminal and the access network device.

Figure 8:
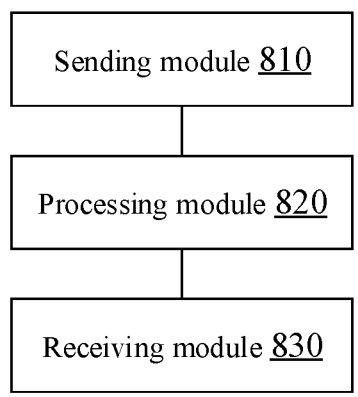
FIG. 8 is a block diagram illustrating an apparatus for detecting downlink control signaling provided by an exemplary embodiment of the disclosure.

FIG. 8 is a block diagram illustrating an apparatus for detecting downlink control signaling provided by an exemplary embodiment of the disclosure. The apparatus may be applied to the terminal 410 shown in FIG. 4. The apparatus may include: a sending module 810, a processing module 820 and a receiving module 830.

The sending module 810 is configured to send a first indication signal to an access network device, the first indication signal being configured to indicate a to-be-used demodulation scheme of the terminal.

The processing module 820 is configured to determine a target demodulation scheme for demodulating target downlink control signaling; acquire a target detection parameter corresponding to the target demodulation scheme; and detect the target downlink control signaling according to the target detection parameter.

In an optional embodiment, the processing module 820 is further configured to start a timer after a predetermined period of time elapses since the first indication signal is sent to the access network device; and determine the to-be-used demodulation scheme as the target demodulation scheme when the timer times out and a second indication signal sent from the access network device is not received.

In an optional embodiment, the processing module 820 is further configured to determine the target demodulation scheme according to a modulation scheme indicated in the second indication signal when the second indication signal is received before the timer times out.

In an optional embodiment, the receiving module 830 is configured to receive the second indication signal sent from the access network device.

The processing module 820 is configured to determine the target demodulation scheme according to the modulation scheme indicated in the second indication signal.

In an optional embodiment, the processing module 820 is further configured to obtain the target detection parameter according to the target demodulation scheme through querying correspondence relationships, the correspondence relationships including correspondence relationships between demodulation schemes and detection parameters; determine a detection moment according to the target detection parameter, and detect the target downlink control signaling at the detection moment; and/or, detect, according to a target position included in the target detection parameter, the target downlink control signaling at the target position.

In an optional embodiment, the receiving module 830 is further configured to receive a third indication signal sent from the access network device, information included in the third indication signal including the correspondence relationships.

In an optional embodiment, the target detection parameter further includes at least one of: a format of the target downlink control signaling, an aggregation level of the target downlink control signaling or a radio network temporary identity of the terminal.

In an optional embodiment, the sending module 810 is further configured to send the first indication signal to the access network device every second time interval.

In an optional embodiment, the processing module 820 is further configured to acquire present channel quality of the terminal; and determine the to-be-used demodulation scheme according to the present channel quality.

The sending module 810 is further configured to send the first indication signal to the access network device.

In an optional embodiment, the receiving module 830 is configured to receive the target downlink control signaling sent from the access network device.

The processing module 820 is further configured to demodulate the target downlink control signaling through the target demodulation scheme.

Figure 9:
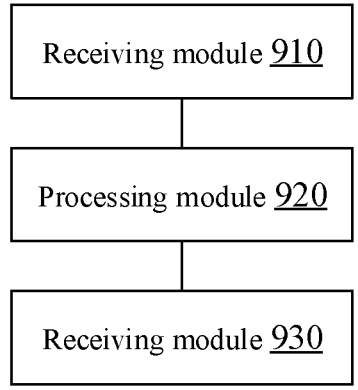
FIG. 9 is a block diagram illustrating an apparatus for determining a modulation scheme provided by an exemplary embodiment of the disclosure.

FIG. 9 is a block diagram illustrating an apparatus for detecting downlink control signaling provided by an exemplary embodiment of the disclosure. The apparatus may be applied to the access network device 420 shown in FIG. 4. The apparatus may include: a receiving module 910, a processing module 920 and a sending module 930.

The receiving module 910 is configured to receive a first indication signal sent from a terminal, the first indication signal being configured to indicate a to-be-used demodulation scheme of the terminal.

The processing module 920 is configured to determine a modulation scheme for target downlink control signaling according to the to-be-used demodulation scheme.

The sending module 930 is configured to send a second indication signal to the terminal, such that the terminal determines a target demodulation scheme for the target downlink control signaling according to a modulation scheme indicated in the second indication signal, the second indication signal being configured to indicate the modulation scheme of the access network device for the target downlink control signaling.

In an optional embodiment, the sending module 930 is further configured to send a third indication signal to the terminal, such that the terminal determines a target detection parameter corresponding to the target demodulation scheme according to information included in the third indication signal, the information comprised in the third indication signal including correspondence relationships between demodulation schemes and detection parameters.

Figure 10:
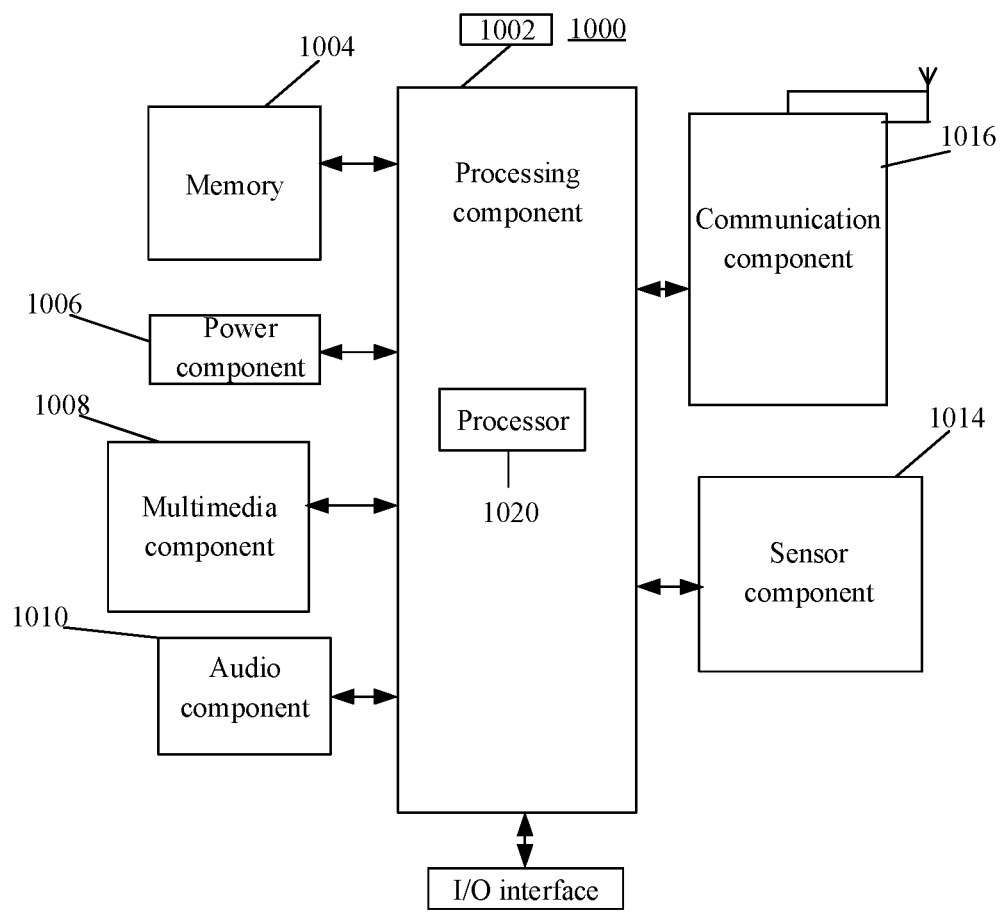
FIG. 10 is a block diagram illustrating a terminal provided by an exemplary embodiment of the disclosure.

FIG. 10 is a block diagram illustrating a terminal provided by an exemplary embodiment of the disclosure. For example, the terminal 1000 may be a mobile phone, a computer, a digital broadcast terminal, a messaging device, a gaming console, a tablet, a medical device, exercise equipment, a Personal Digital Assistant (PDA), and the like.

Referring to FIG. 10, the terminal 1000 may include one or more of the following components: a processing component 1002, a memory 1004, a power component 1006, a multimedia component 1008, an audio component 1010, an Input/Output (I/O) interface 1012, a sensor component 1014, and a communication component 1016.

The processing component 1002 typically controls overall operations of the terminal 1000, such as the operations associated with display, telephone calls, data communications, camera operations, and recording operations. The processing component 1002 may include one or more processors 1020 to execute instructions to perform all or part of the operations in the above described methods. Moreover, the processing component 1002 may include one or more modules which facilitate the interaction between the processing component 1002 and other components. For instance, the processing component 1002 may include a multimedia module to facilitate the interaction between the multimedia component 1008 and the processing component 1002.

The memory 1004 is configured to store various types of data to support the operation of the apparatus 1000. Examples of such data include instructions for any application or method operated on the terminal 1000, contact data, phonebook data, messages, pictures, videos, etc. The memory 1004 may be implemented by using any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The power component 1006 provides power to various components of the terminal 1000. The power component 1006 may include a power management system, one or more power sources, and any other components associated with the generation, management, and distribution of power in the terminal 1000.

The multimedia component 1008 includes a screen providing an output interface between the terminal 1000 and the user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also sense a period of time and a pressure associated with the touch or swipe action. In some embodiments, the multimedia component 1008 includes a front camera and/or a rear camera. The front camera and/or the rear camera may receive external multimedia data when the apparatus 1000 is in an operation mode, such as a photographing mode or a video mode. Each of the front camera and the rear camera may be a fixed optical lens system or have focus and optical zoom capability.

The audio component 1010 is configured to output and/or input audio signals. For example, the audio component 1010 includes a Microphone ("MIC") configured to receive an external audio signal when the terminal 1000 is in an operation mode, such as a call mode, a recording mode, and a voice recognition mode. The received audio signal may further be stored in the memory 1004 or transmitted via the communication component 1016. In some embodiments, the audio component 1010 further includes a speaker configured to output audio signals.

The I/O interface 1012 provides an interface between the processing component 1002 and peripheral interface modules. The peripheral interface modules may be a keyboard, a click wheel, buttons, and the like. The buttons may include, but are not limited to, a home button, a volume button, a starting button, and a locking button.

The sensor component 1014 includes one or more sensors to provide status assessments of various aspects of the terminal 1000. For instance, the sensor component 1014 may detect an open/closed status of the device 1000, relative positioning of components, e.g., the display and the keypad of the terminal 1000, a change in position of the terminal 1000 or a component of the terminal 1000, a presence or absence of user contact with the terminal 1000, an orientation or an acceleration/deceleration of the terminal 1000, and a change in temperature of the terminal 1000. The sensor component 1014 may include a proximity sensor, configured to detect the presence of nearby objects without any physical contact. The sensor component 1014 may also include a light sensor, such as a Complementary Metal Oxide Semiconductor (CMOS) or Charge Coupled Device (CCD) image sensor, configured for use in an imaging application. In some embodiments, the sensor component 1014 may also include an accelerometer sensor, a gyroscope sensor, a magnetic sensor, a pressure sensor, or a temperature sensor.

The communication component 1016 is configured to facilitate communication, wired or wirelessly, between the terminal 1000 and other devices. The terminal 1000 may access a wireless network based on a communication standard, such as WiFi, 2G, or 3G, or a combination thereof. In an exemplary embodiment, the communication component 1016 receives a broadcast signal or broadcast associated information from an external broadcast management system via a broadcast channel. In an exemplary embodiment, the communication component 1016 further includes a Near Field Communication (NFC) module to facilitate short-range communications.

In an exemplary embodiment, the terminal 1000 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors, or other electronic components, for performing the above described methods.

In an exemplary embodiment, a non-temporary computer-readable storage medium including an instruction is further provided, for example, the memory 1004 including the instruction; and the instruction may be executed by the processor 1020 of the terminal 1000 to complete the above method. For example, the non-transitory computer-readable storage medium may be a Read Only Memory (ROM), a Random Access Memory (RAM), a Compact Disc Read-Only Memory (CD-ROM), a magnetic tape, a floppy disc, an optical data storage device and the like.

A non-transitory computer-readable storage medium is provided; and an instruction in the storage medium causes, when executed by a processor of a mobile terminal, the mobile terminal to perform the method for detecting the downlink control signaling.

Figure 11:
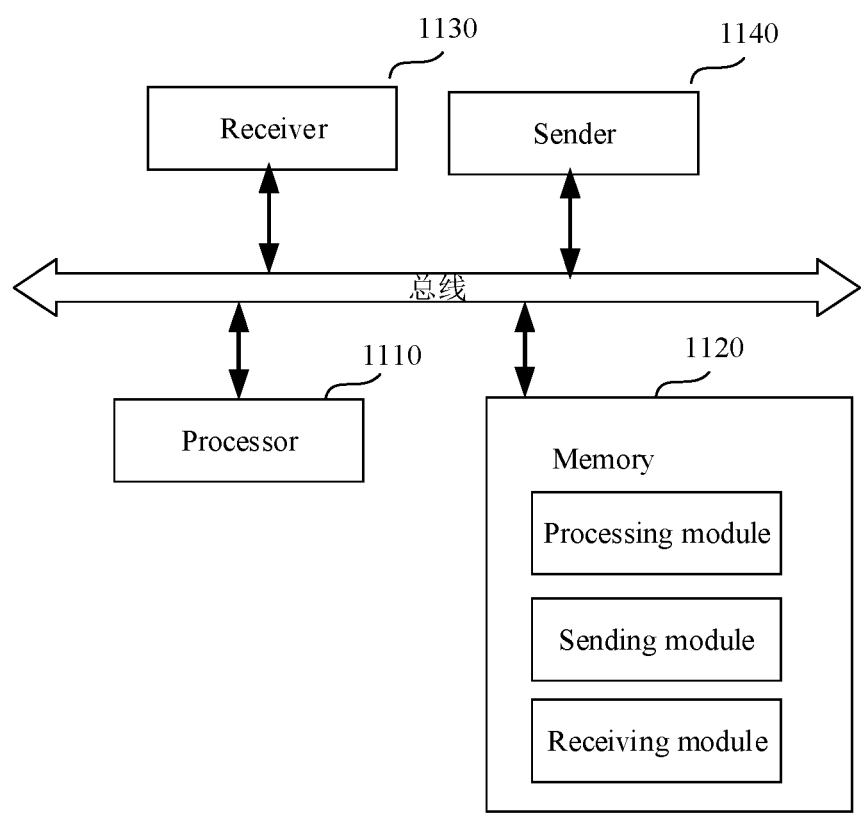
FIG. 11 is a block diagram illustrating an access network device provided by an exemplary embodiment of the disclosure.

FIG. 11 is a structural block diagram illustrating an access network device provided by an exemplary embodiment of the disclosure. The access network device may include: a processor 1110, a memory 1120, a receiver 1130 and a sender 1140.

The processor 1110 is respectively connected to the memory 1120, the receiver 1130 and the sender 1140 through a bus.

The receiver 1130 and the sender 1140 are configured to implement communications with other electronic devices.

The processor 1110 may include one or more processing cores. The processor 1110 runs by operating an operation system or an application program module, to implement the method executed by the access network device in the above method embodiments.

Optionally, the memory 1120 may store an operating system and an application program module required by at least one function. Optionally, the application program module may include: a receiving module, a sending module and a processing module. The receiving module is configured to implement a operation relevant to receiving, the sending module is configured to implement a operation relevant to sending, and the processing module is configured to implement a operation relevant to processing.

Additionally, the memory 1120 may be implemented by using any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

It is to be understood by the person skilled in the art that the structure illustrated in FIG. 11 does not form a limit to the electronic device, and may include more or less components than those shown in the figure, or combines some components, or is arranged with different components.

The embodiments of the disclosure further provide a computer-readable medium. The computer-readable medium stores at least one instruction. The at least one instruction is loaded and executed by a processor to implement the method for detecting the downlink control signaling in the above embodiments.

The embodiments of the disclosure further provide a computer program product. The computer program product stores at least one instruction. The at least one instruction is loaded and executed by a processor to implement the method for detecting the downlink control signaling in the above embodiments.

It is to be understood that the term "multiple" in the disclosure refers to more or more than two. The "and/or" is an association relationship for describing associated objects and represents that three relationships may exist. For example, A and/or B may represent the following three cases: only A exists, both A and B exist, and only B exists. The character "/" generally indicates that the related objects are in an "or" relationship.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

The serial numbers of the embodiments of the disclosure are merely for description and do not represent a preference of the embodiments.

Those of ordinary skill in the art may know that all or part of the operations in the above embodiments may be implemented by hardware, and may also be implemented by instructing related hardware through a program, the program may be stored in a computer-readable storage medium, and the storage medium may include: an ROM, an RAM, a magnetic disk or an optical disc.

The descriptions above are only preferred embodiments of the disclosure, but are not intended to limit the disclosure; and any modifications, equivalent substitutions, improvements and the like made within the spirits and principles of the disclosure are all included in the protection scope of the disclosure.

What is claimed is:

1. A method for detecting downlink control signaling, comprising:

sending, by a terminal, a first indication signal to an access network device, the first indication signal being configured to indicate a to-be-used demodulation scheme of the terminal;

determining, by the terminal, a target demodulation scheme for demodulating target downlink control signaling;

acquiring, by the terminal, a target detection parameter corresponding to the target demodulation scheme; and detecting, by the terminal, the target downlink control signaling according to the target detection parameter, wherein determining, by the terminal, the target demodulation scheme for demodulating the target downlink control signaling comprises:

starting, by the terminal, a timer after a predetermined period of time elapses since the first indication signal is sent to the access network device; and determining, by the terminal, the to-be-used demodulation scheme as the target demodulation scheme when the timer times out and a second indication signal sent from the access network device is not received, wherein the second indication signal is a signal sent to the terminal after the access network device determines a modulation scheme for the target downlink control signaling according to the to-be-used demodulation scheme upon the reception of the first indication signal, and the second indication signal is configured to indicate the modulation scheme of the access network device for the target downlink control signaling.

2. The method of claim 1, wherein determining, by the terminal, the target demodulation scheme for demodulating the target downlink control signaling further comprises:

determining, by the terminal, the target demodulation scheme according to the modulation scheme indicated in the second indication signal when the terminal receives the second indication signal before the timer times out.

3. The method of claim 1, wherein determining, by the terminal, the target demodulation scheme for demodulating the target downlink control signaling comprises:
receiving, by the terminal, the second indication signal sent from the access network device; and
determining, by the terminal, the target demodulation scheme according to the modulation scheme indicated in the second indication signal.

4. The method of claim 1, wherein detecting, by the terminal, the target downlink control signaling according to the target detection parameter comprises:
obtaining, by the terminal, the target detection parameter according to the target demodulation scheme through querying correspondence relationships, the correspondence relationships comprising correspondence relationships between demodulation schemes and detection parameters; and
determining, by the terminal, a detection moment according to the target detection parameter, and detecting, by the terminal, the target downlink control signaling at the detection moment; and/or, detecting, by the terminal according to a target position comprised in the target detection parameter, the target downlink control signaling at the target position.

5. The method of claim 4, further comprising: before sending, by the terminal, the first indication signal to the access network device,
receiving, by the terminal, a third indication signal sent from the access network device, information comprised in the third indication signal comprising the correspondence relationships.

6. The method of claim 4, wherein the target detection parameter further comprises at least one of: a format of the target downlink control signaling, an aggregation level of the target downlink control signaling or a radio network temporary identity of the terminal.

7. The method of claim 1, wherein sending, by the terminal, the first indication signal to the access network device comprises:
sending, by the terminal, the first indication signal to the access network device every second time interval.

8. The method of claim 1, wherein sending, by the terminal, the first indication signal to the access network device comprises:
acquiring, by the terminal, present channel quality of the terminal;
determining, by the terminal, the to-be-used demodulation scheme according to the present channel quality; and
sending, by the terminal, the first indication signal to the access network device.

9. The method of claim 1, further comprising: after detecting, by the terminal, the target downlink control signaling according to the target detection parameter,
receiving, by the terminal, the target downlink control signaling sent from the access network device; and
demodulating, by the terminal, the target downlink control signaling through the target demodulation scheme.

10. A method for determining a modulation scheme, comprising:
receiving, by an access network device, a first indication signal sent from a terminal, the first indication signal being configured to indicate a to-be-used demodulation scheme of the terminal;
determining, by the access network device, a modulation scheme for target downlink control signaling according to the to-be-used demodulation scheme; and
sending, by the access network device, a second indication signal to the terminal, such that the terminal determines a target demodulation scheme for the target downlink control signaling according to a modulation scheme indicated in the second indication signal, the second indication signal being configured to indicate the modulation scheme of the access network device for the target downlink control signaling,
wherein a timer is started by the terminal after a predetermined period of time elapses since the first indication signal is sent to the access network device; and the to-be-used demodulation scheme is determined by the terminal as the target demodulation scheme when the timer times out and the second indication signal sent from the access network device is not received.

11. The method of claim 10, further comprising: before receiving, by the access network device, the first indication signal sent from the terminal,
sending, by the access network device, a third indication signal to the terminal, such that the terminal determines a target detection parameter corresponding to the target demodulation scheme according to information comprised in the third indication signal, the information comprised in the third indication signal comprising correspondence relationships between demodulation schemes and detection parameters.

12. An apparatus for detecting downlink control signaling, comprising:
a processor; and
a memory, configured to store at least one instruction executable by the processor,
wherein the processor is configured to:
send a first indication signal to an access network device, the first indication signal being configured to indicate a to-be-used demodulation scheme of the terminal; and
determine a target demodulation scheme for demodulating target downlink control signaling; acquire a target detection parameter corresponding to the target demodulation scheme; and detect the target downlink control signaling according to the target detection parameter,
wherein to determine the target demodulation scheme for demodulating the target downlink control signaling, the processor is configured to:
start a timer after a predetermined period of time elapses since the first indication signal is sent to the access network device; and
determine the to-be-used demodulation scheme as the target demodulation scheme when the timer times out and a second indication signal sent from the access network device is not received,
wherein the second indication signal is a signal sent to the terminal after the access network device determines a modulation scheme for the target downlink control signaling according to the to-be-used demodulation scheme upon the reception of the first indication signal, and the second indication signal is configured to indicate the modulation scheme of the access network device for the target downlink control signaling.

13. The apparatus of claim 12, wherein to determine the target demodulation scheme for demodulating the target downlink control signaling, the processor is further configured to:

determine the target demodulation scheme according to the modulation scheme indicated in the second indication signal when the terminal receives the second indication signal before the timer times out.

14. The apparatus of claim 12, wherein to determine the target demodulation scheme for demodulating the target downlink control signaling, the processor is configured to:
   receive the second indication signal sent from the access network device; and
   determine the target demodulation scheme according to the modulation scheme indicated in the second indication signal.

15. The apparatus of claim 12, wherein to detect the target downlink control signaling according to the target detection parameter, the processor is configured to:
   obtain the target detection parameter according to the target demodulation scheme through querying correspondence relationships, the correspondence relationships comprising correspondence relationships between demodulation schemes and detection parameters; and
   determine a detection moment according to the target detection parameter, and detect the target downlink control signaling at the detection moment; and/or, detect, according to a target position comprised in the target detection parameter, the target downlink control signaling at the target position.

16. The apparatus of claim 15, wherein the processor is further configured to: before sending the first indication signal to the access network device,
   receive a third indication signal sent from the access network device, information comprised in the third indication signal comprising the correspondence relationships.

17. The apparatus of claim 15, wherein the target detection parameter further comprises at least one of: a format of the target downlink control signaling, an aggregation level of the target downlink control signaling or a radio network temporary identity of the terminal.

* * * * *